US011555518B2

(12) United States Patent
Yamada et al.

(10) Patent No.: US 11,555,518 B2
(45) Date of Patent: Jan. 17, 2023

(54) LINEAR MOTION GUIDE UNIT

(71) Applicant: NIPPON THOMPSON CO., LTD., Tokyo (JP)

(72) Inventors: Kazuki Yamada, Mino (JP); Toshimichi Tanaka, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 17/511,972

(22) Filed: Oct. 27, 2021

(65) Prior Publication Data
US 2022/0128091 A1     Apr. 28, 2022

(30) Foreign Application Priority Data
Oct. 28, 2020     (JP) .............................. JP2020-180708

(51) Int. Cl.
*F16C 29/06* (2006.01)
*F16C 33/66* (2006.01)

(52) U.S. Cl.
CPC ...... *F16C 29/0638* (2013.01); *F16C 29/0609* (2013.01); *F16C 33/6681* (2013.01)

(58) Field of Classification Search
CPC .............. F16C 29/0609; F16C 29/0638; F16C 29/064; F16C 29/042; F16C 29/0645; F16C 29/0647; F16C 29/0652; F16C 29/0654; F16C 29/0657; F16C 29/0659; F16C 29/0661; F16C 29/0664; F16C 33/6681
See application file for complete search history.

(56) References Cited

U.S. PATENT DOCUMENTS

| | | | |
|---|---|---|---|
| 6,210,039 B1 * | 4/2001 | Teramachi | F16C 29/005 384/49 |
| 7,677,804 B2 * | 3/2010 | Geka | F16C 29/0604 384/43 |
| 8,033,730 B2 * | 10/2011 | Kakei | F16C 29/005 384/44 |
| 2003/0053724 A1 | 3/2003 | Matsui et al. | |
| 2018/0245633 A1 * | 8/2018 | Kito | F16C 29/0657 |

FOREIGN PATENT DOCUMENTS

| | | | |
|---|---|---|---|
| DE | 112012004607 T5 * | 8/2014 | .......... F16C 29/0609 |
| JP | 2003090338 A | 3/2003 | |
| JP | 2018135981 A | 8/2018 | |
| TW | I558925 B * | 11/2016 | |

* cited by examiner

*Primary Examiner* — Phillip A Johnson
(74) *Attorney, Agent, or Firm* — Browdy and Neimark, PLLC (57) ABSTRACT

A linear motion guide unit includes a rail having first rolling surfaces extending longitudinally parallel to each other, a movable slider fitting over the rail, second rolling surfaces opposing the first rolling surfaces, respectively, rolling elements that roll while contacting the first and second rolling surfaces, a loop path through which the rolling elements circulate composed of a load-carrying race formed with the first and second rolling surfaces, a first circulation passage formed in the slider parallel to the load-carrying race, and two second circulation passages connecting the load-carrying race and the first circulation passage. The load-carrying race has a first portion at a boundary with the second circulation passage, and a contact angle of the rolling element with the second rolling surface in the first portion is greater than a contact angle of the rolling element with the second rolling surface in a remaining portion of the load-carrying race.

8 Claims, 8 Drawing Sheets

LINEAR MOTION GUIDE UNIT

BACKGROUND OF THE INVENTION

1. Field of the Invention

The present invention relates to a linear motion guide unit. The present application claims priority based on Japanese Patent Application No. 2020-180708 filed on Oct. 28, 2020, the entire contents of which are incorporated herein by reference.

2. Description of the Related Art

A linear motion guide unit is known which includes a rail having a pair of first rolling surfaces, a slider having a pair of second rolling surfaces opposing the pair of first rolling surfaces, respectively, and a plurality of rolling elements arranged to be able to roll on the first and second rolling surfaces to circulate through an annular space (see, for example, Patent Literature 1).

The following configurations are known. A circulation passage for the rolling elements is composed of a load-carrying race, a first circulation passage, and two second circulation passages. The load-carrying race is formed at the opposing portions of the rail and the slider. The first circulation passage is formed in the slider, in parallel with the load-carrying race. The second circulation passages are connecting portions between the load-carrying race and the first circulation passage. The slider includes a carriage, a first circulation passage member, and an end cap, and a spacer is arranged between the carriage and the end cap (see, for example, Patent Literature 2).

CITATION LIST

Patent Literature

Patent Literature 1: Japanese Patent Application Laid-Open No. 2018-135981
Patent Literature 2: Japanese Patent Application Laid-Open No. 2003-090338

SUMMARY OF THE INVENTION

Linear motion guide units are used in a variety of installation configurations, and the rolling elements would likely to clog depending on the installation orientation. Therefore, an object of the present invention is to provide a linear motion guide unit in which clogging of the rolling elements is suppressed regardless of the manner of installation of the linear motion guide unit.

A linear motion guide unit according to the present disclosure includes:
a rail having a pair of first rolling surfaces extending parallel to each other in a longitudinal direction;
a slider fitting over the rail in a relatively movable manner and having a pair of second rolling surfaces opposing the pair of first rolling surfaces, respectively; and
a plurality of spheres as rolling elements that roll while contacting the first and second rolling surfaces;
the linear motion guide unit having formed therein a loop path composed of
a load-carrying race formed with the first rolling surface and the second rolling surface,
a first circulation passage parallel to the load-carrying race and formed in the slider, and
two second circulation passages that are connecting portions between the load-carrying race and the first circulation passage,
the plurality of rolling elements circulating through the loop path, wherein
the load-carrying race has a load-carrying race first portion at a boundary with the second circulation passage, a contact angle $\theta_1$ of the rolling element with the second rolling surface in the load-carrying race first portion being greater than a contact angle $\theta_2$ of the rolling element with the second rolling surface in a portion of the load-carrying race other than the load-carrying race first portion,
the slider includes a carriage, a pair of end caps disposed to sandwich the carriage therebetween in the longitudinal direction of the rail, and a spacer disposed between at least one of the pair of end caps and the carriage, and
the spacer has the second rolling surface constituting the load-carrying race first portion.

According to the above-described linear motion guide unit, clogging of the rolling elements is suppressed regardless of the manner of installation of the linear motion guide unit.

DESCRIPTION OF THE PREFERRED EMBODIMENTS

Outline of Embodiments

Firstly, embodiments of the present disclosure will be listed and described. A linear motion guide unit of the present disclosure includes: a rail having a pair of first rolling surfaces extending parallel to each other in a longitudinal direction; a slider that fits over the rail in a relatively movable manner and has a pair of second rolling surfaces opposing the pair of first rolling surfaces, respectively; and a plurality of spheres as rolling elements that roll while contacting the first and second rolling surfaces. The linear motion guide unit of the present disclosure has formed therein a loop path composed of a load-carrying race formed with the first rolling surface and the second rolling surface, a first circulation passage parallel to the load-carrying race and formed in the slider, and two second circulation passages that are connecting portions between the load-carrying race and the first circulation passage, and the plurality of rolling elements circulate through the loop path. In the linear motion guide unit of the present disclosure, the load-carrying race has a load-carrying race first portion at a boundary with the second circulation passage, and a contact angle $\theta_1$ of the rolling element with the second rolling surface in the load-carrying race first portion is greater than a contact angle $\theta_2$ of the rolling element with the second rolling surface in a portion of the load-carrying race other than the load-carrying race first portion. In the linear motion guide unit of the present disclosure, the slider includes a carriage, a pair of end caps disposed to sandwich the carriage therebetween in the longitudinal direction of the rail, and a spacer disposed between at least one of the pair of end caps and the carriage, and the spacer has the second rolling surface constituting the load-carrying race first portion.

As one of the manners of installing a linear motion guide unit, the unit may be installed such that the circulation passages on both sides of the rail are located above and below each other. This manner is referred to as sideways installation or sideways orientation. Conventionally, when a linear motion guide unit is installed sideways, improper movement of the rolling elements would likely occur. A result of analysis of the improper movement of the rolling element showed that the following events would be one of the causes. When the linear motion guide unit is installed sideways, while the load-carrying race and the first circulation passage extend in a horizontal direction, the second circulation passages connecting them extend in a vertical direction. Therefore, a rolling element that has entered a second circulation passage from the first circulation passage located upward falls by its own weight through the second circulation passage. When the rolling elements accelerated by the self-weight fall enter the load-carrying race as the load area one after another without interruption, then the proper spacing between the rolling elements is lost. Accordingly, the rolling elements compete with each other in the load-carrying race, causing clogging of the rolling elements, resulting in the occurrence of improper movement of the slider.

To address this problem, the way of suppressing the competition of rolling elements in the load-carrying race as the load area was investigated. An idea obtained was to provide a travel adjustment section, at the position where the rolling element enters the load-carrying race from the second circulation passage, to adjust the rolling of the rolling element to thereby create a speed difference between the target rolling element and the other rolling elements rolling on the load-carrying race. A result of further investigations showed that the orbital speed of the rolling element that enters the load-carrying race from the second circulation passage can be suppressed by a configuration of increasing the contact angle between the rolling element and the load-carrying race in the travel adjustment section. It has been found that this configuration can create a speed difference between the rolling element that rolls ahead and the rolling element that follows in the load-carrying race, thereby creating a proper spacing between the rolling elements and suppressing the competition of the rolling elements.

According to the linear motion guide unit of the present disclosure, regardless of the installation direction of the linear motion guide unit, especially even when the linear motion guide unit is installed sideways, improper movement of the rolling elements is less likely to occur and smooth operation of the linear motion guide unit is realized. In addition, in the linear motion guide unit of the present disclosure, with a simple configuration that the load-carrying race is provided with a portion, at the boundary with the second circulation passage, in which the contact angle between the rolling element and the wall surface is greater than the contact angle between the rolling element and the wall surface in other portions of the load-carrying race, the orbital speed of the rolling element passing through that portion can be changed reliably, whereby a proper gap can be created between the rolling elements.

Further, in the linear motion guide unit of the present disclosure, the slider includes a carriage, a pair of end caps disposed to sandwich the carriage therebetween in the longitudinal direction of the rail, and a spacer disposed between at least one of the pair of end caps and the carriage. The spacer has the second rolling surface constituting the load-carrying race first portion.

According to this configuration, an insertion member that constitutes the wall surface of the load-carrying race first portion, which is the travel adjustment section, is incorporated as a part of the spacer in the linear motion guide unit. This facilitates the setting, adjustment, change and so on of the travel adjustment section, ensuring excellent maintainability and production rationality of the unit.

In the linear motion guide unit of the present disclosure, the spacer may be a resin molded member.

While the majority of the rail and the slider of the linear motion guide unit is produced using steel materials, the spacer as the resin molded member is easy to produce and ensures necessary strength and durability.

In the linear motion guide unit of the present disclosure, the load-carrying race first portion may have a length in the longitudinal direction of the rail of not less than 0.25 times and not more than 3 times the diameter of the rolling element.

The longitudinal direction of the rail is the length direction of the load-carrying race first portion. The length direction of the load-carrying race first portion is the direction along the raceway of the rolling elements. That is, the length of the load-carrying race first portion in the length direction is the length of a section (travel adjustment section) in the raceway in which the contact angle differs from that in the main region of the raceway. In other words, the length of the load-carrying race first portion is the length of the section where the orbital speed of the rolling elements changes (decreases). According to the present disclosure, smooth sliding of the linear motion guide unit is achieved by providing, in the loop path, the contact angle changed section having a very short length of not less than 0.25 times and not more than 3 times the diameter of the rolling element. According to this configuration, the occurrence of improper movement of the rolling elements can be effectively suppressed while minimizing the influence on the design of the linear motion guide unit as a whole.

In the linear motion guide unit of the present disclosure, in the load-carrying race first portion, the rolling element may contact portions of the wall surface of the load-carrying race first portion of the spacer at two points. Each of surfaces containing the respective contact points may be a flat surface extending in the longitudinal direction of the rail.

By making the surfaces containing the contact points between the rolling element and the wall surface of the load-carrying race first portion each be a flat surface, the shape becomes simple, and a spacer that is easy to produce and has few individual differences can be obtained by a rational producing process. In the present disclosure, four travel adjustment sections (load-carrying race first portions) are provided in one linear motion guide unit. Adopting such a shape can reduce the possibility of defects arising from individual differences in the travel adjustment sections.

The contact angle $\theta_1$ in the load-carrying race first portion may be set to be 1° to 20° greater than the contact angle $\theta_2$ in the load-carrying race other than the load-carrying race first portion.

With the difference in contact angle being set in the range of 1° to 20°, the rolling of the rolling elements can be adjusted to maintain the spacing between the rolling elements, without interfering with the traveling of the rolling elements, whereby smooth operation of the linear motion guide unit can be achieved.

Description of Specific Embodiment

A specific embodiment of the linear motion guide unit of the present disclosure will be described below with reference to the drawings. In the drawings referenced below, the same or corresponding portions are denoted by the same reference numerals and the description thereof will not be repeated.

Figure 1:
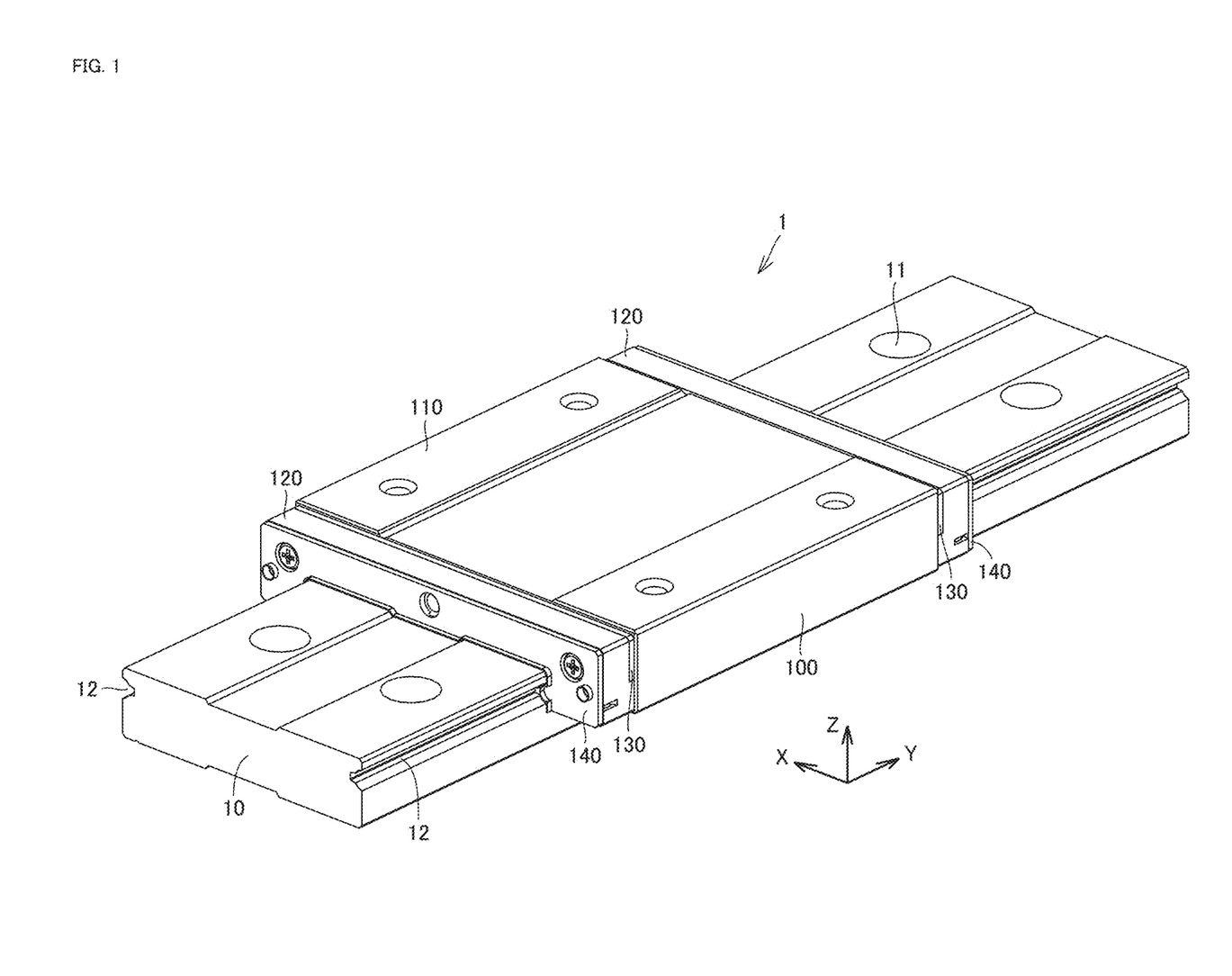
FIG. 1 is a perspective view showing the structure of a linear motion guide unit in Embodiment 1.
Figure 2:
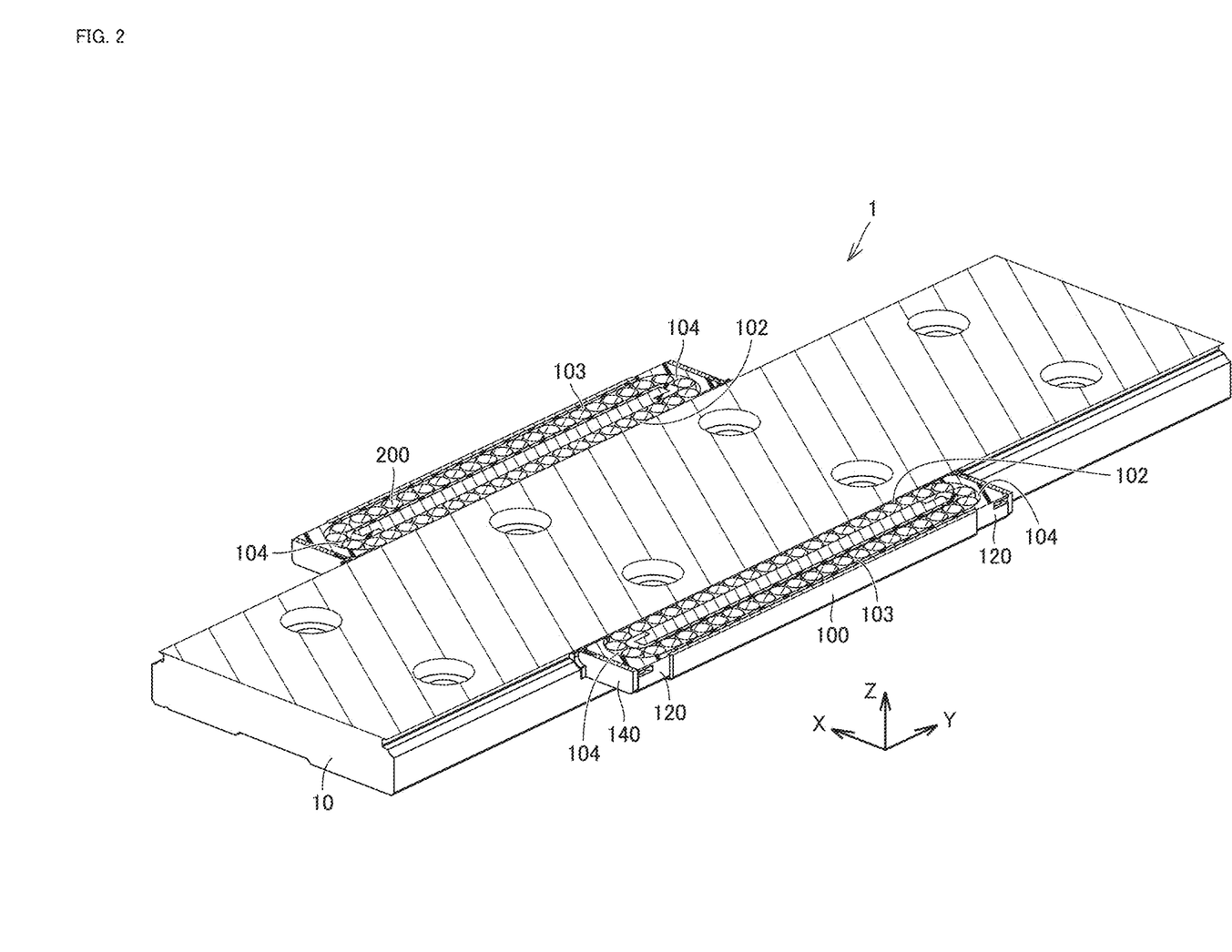
FIG. 2 is a perspective view showing, in cross section, the structure of the linear motion guide unit in Embodiment 1.
Figure 3:
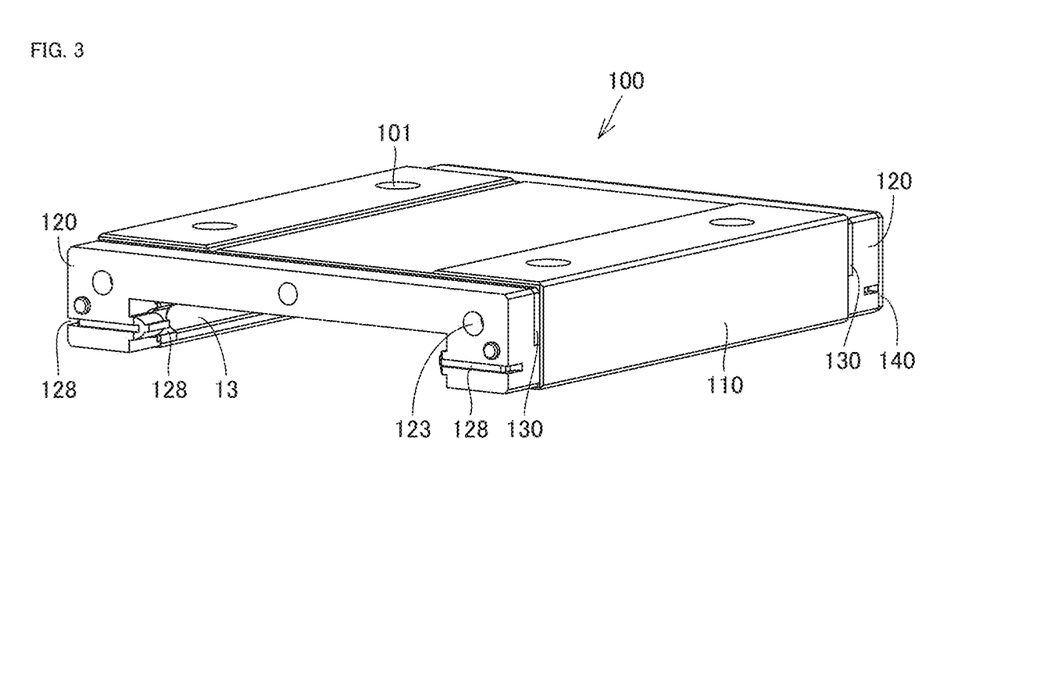
FIG. 3 is a perspective view showing the structure of a slider in Embodiment 1.

FIG. 1 is a perspective view showing the structure of a linear motion guide unit 1 in an embodiment of the present disclosure. In FIG. 1, the X-axis direction is the width direction of the linear motion guide unit 1, the Y-axis direction is the longitudinal direction of the linear motion guide unit 1 (rail 10), and the Z-axis direction is the thickness direction of the linear motion guide unit 1. FIG. 2 is a cross-sectional view of the linear motion guide unit 1 of FIG. 1, showing the state cut at a central portion in the Z-axis direction. FIG. 3 is a perspective view showing a portion of a slider 100 of the linear motion guide unit 1.

Referring to FIGS. 1 and 2, the linear motion guide unit 1 includes a rail 10, a slider 100, and balls 200 that are rolling elements. A plurality of balls 200 as the rolling elements are inserted in the linear motion guide unit 1. The linear motion guide unit 1 has, on each side along the longitudinal direction, a loop path that is composed of: a load-carrying race 102 formed with the rail 10 and the slider 100 opposing each other, a first circulation passage 103 parallel to the load-carrying race 102 and formed in the slider 100, and two second circulation passages 104 that are connecting portions between the load-carrying race 102 and the first circulation passage 103. In Embodiment 1, the loop path has a length of about 100 mm. The ball 200 has a diameter of 3 mm, and about 32 balls 200 are enclosed in the loop path. The length of the loop path and the size and number of the balls are not limited thereto; for example, the loop path can be around 20 mm to 1000 mm in length, and 10 to 60 balls having a diameter of around 0.4 mm to 13 mm, for example, can be used as the balls (rolling elements).

Referring to FIG. 1, the rail 10 is provided with a mounting hole 11 for fixing a counterpart to which the linear motion guide unit 1 is mounted. The rail 10 has first raceway grooves 12 formed on both side surfaces in the length direction. The first raceway grooves 12 have wall surfaces serving as the first rolling surfaces. The first raceway grooves 12 are a pair of concave grooves formed on both side surfaces in the length direction of the rail 10. The concave shape of the first raceway grooves 12 is the same over the entire length of the rail 10. In other words, the shape and angle of the side walls constituting the first raceway grooves 12 and the depth of the grooves are constant over the entire length of the first raceway grooves 12.

The slider 100 fits over the rail 10. The rail 10 and the slider 100 are slidable relative to each other. The slider 100 has a carriage 110, an end cap 120 mounted on each end face in the length direction of the carriage 110, a spacer 130 inserted between the carriage 110 and the end cap 120, and an end seal 140 attached to an outer end face of the end cap 120.

FIG. 3 shows the slider 100 with the end seal 140 on one side removed. Referring to FIGS. 2 and 3, the slider 100 is composed of an upper portion and a sleeve portion hanging from each side of the upper portion. The upper portion of the slider 100 has a plurality of holes 101 formed therein, which are screw holes for mounting a counterpart such as a work or equipment. The sleeve portion of the slider 100 has formed therein the first circulation passage 103 and the second circulation passages 104 continuous with respective ends of the first circulation passage 103. In addition, the sleeve portion of the slider 100 has a second raceway groove 13 formed on a surface opposing the rail 10. The wall surface of the second raceway groove 13 serves as the second rolling surface. The first raceway groove 12 of the rail 10 and the second raceway groove 13 of the slider 100 oppose each other, thereby forming the load-carrying race 102 therebetween. The tubular passage formed with the first raceway groove 12 of the rail 10 and the second raceway groove 13 of the slider 100 opposing each other is a load-carrying race second portion 102b (FIG. 12), which is the main region of the load-carrying race 102. The load-carrying race 102 and the first circulation passage 103 are straight tubular passages along the length direction of the rail 10. On the other hand, the second circulation passages 104 are arc-shaped tubular passages connecting them. The load-carrying race 102, the first circulation passage 103, and the second circulation passages 104 connecting them form an endless loop path. The linear motion guide unit 1 is an infinite circulation type linear motion guide unit in which the balls 200 enclosed in the loop path circulate infinitely in the loop path.

For the slider 100 to move on the rail 10, the balls 200 roll to cause the slider 100 to slide on the rail 10. The end cap 120 has a through hole 123 formed therein, into which a fixing bolt is inserted for fixing the end cap 120 to the carriage 110 together with the end seal 140 and the spacer 130. The end cap 120 has a retaining band groove 128 formed on its front face (the face opposing the end seal 140). The retaining band 150 (FIG. 12) is a band that keeps the balls 200 from falling off when the slider 100 is detached from the rail 10.

Figure 4:
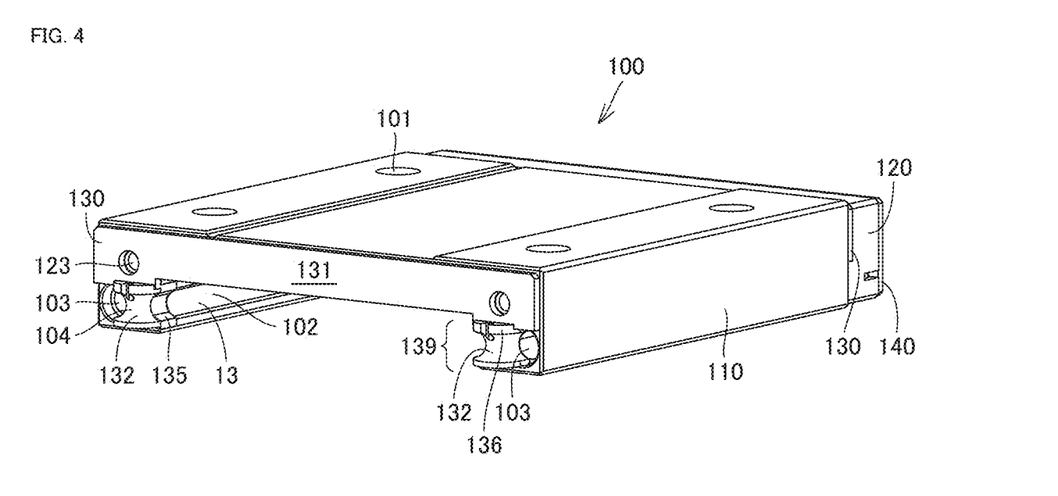
FIG. 4 is a perspective view showing the structure of the slider in Embodiment 1, with an end seal and an end cap removed therefrom.

FIG. 4 shows the slider 100 with the end cap 120 and the end seal 140 on one side removed to expose the spacer 130 on that side. The spacers 130 are disposed in contact with both end faces of the carriage 110 to sandwich the carriage 110 therebetween in the longitudinal direction of the slider 100. Referring to FIG. 4, the spacer 130 roughly includes a spacer plate 131 located above and extending across the width direction of the slider 100, and leg portions 139 each located below the spacer plate 131 and constituting a portion of the loop path. The leg portion 139 of the spacer 130 includes a second circulation passage inner peripheral wall 132 that is a wall surface of the second circulation passage 104. The leg portion 139 of the spacer 130 further includes an insertion member 135 located at a boundary of the second circulation passage 104 and the load-carrying race 102. The insertion member 135 is formed integrally with the spacer 130. The insertion member 135 constitutes a portion of the second rolling surface of the load-carrying race 102. When the rail 10 and the slider 100 are combined, the insertion member 135 and the first raceway groove 12 of the rail 10 oppose each other to form the load-carrying race 102 therebetween. The tubular passage formed with the insertion member 135 and the first raceway groove 12 of the rail 10 opposing each other is a load-carrying race first portion 102a (FIG. 12), which is a portion of the load-carrying race 102 at the boundary between the load-carrying race 102 and the second circulation passage 104. The inner peripheral surface of the insertion member 135 and the second raceway groove 13 are continuous, thereby constituting the second rolling surface of the load-carrying race 102.

The spacer plate 131 has a through hole 123 formed therein. The through hole 123 is a hole into which a fixing bolt is inserted for fixing the spacer 130 to the carriage 110 together with the end cap 120 and the end seal 140 (FIG. 1). The second circulation passage inner peripheral wall 132 has a protrusion 136 formed in its upper portion. The protrusion 136 facilitates positioning when combining the spacer 130 and the end cap 120.

Figure 5:
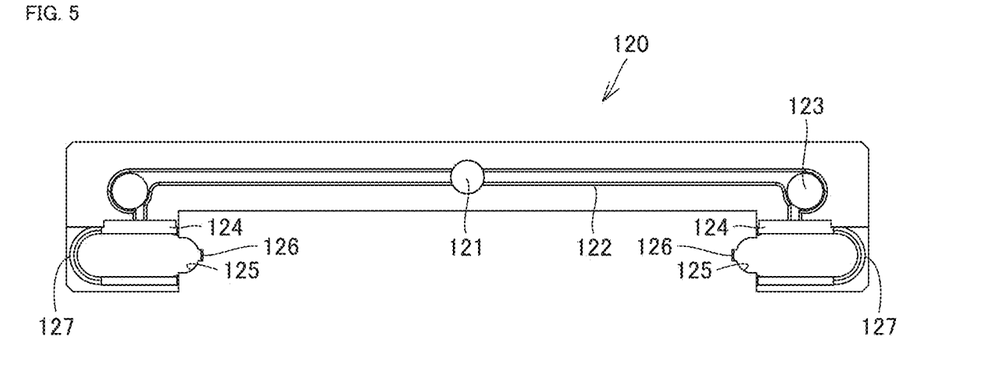
FIG. 5 is a rear view showing the structure of the end cap in Embodiment 1.
Figure 6:
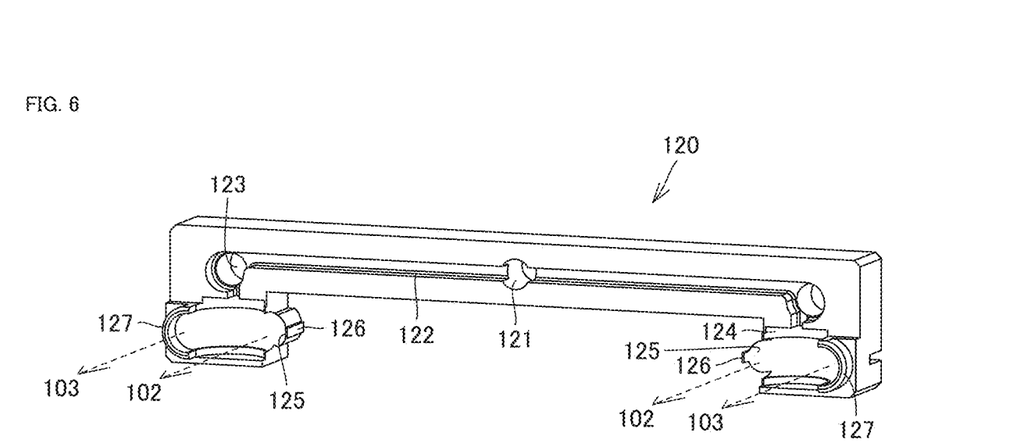
FIG. 6 is a perspective view showing the structure of the end cap in Embodiment 1.

FIG. 5 shows a rear face of the end cap 120 (the face opposing the spacer 130). FIG. 6 is a perspective view of the rear face of the end cap 120. Referring to FIGS. 5 and 6, in the end cap 120, an oil hole 121 and an oil groove 122 connecting to the oil hole 121 are formed. A lubricant fed from a grease inlet provided in the end seal 140 may be supplied through the oil hole 121 and the oil groove 122 into the loop path.

The end cap 120 has a second circulation passage outer peripheral wall 125. The second circulation passage outer peripheral wall 125 opposes the second circulation passage inner peripheral wall 132 (FIG. 4) of the spacer 130 to form the turnaround passage 104. The second circulation passage outer peripheral wall 125 has a recess 124 formed in its upper portion for use in positioning. The recess 124 is shaped to be fitted with the protrusion 136 (FIG. 4) of the spacer 130. When the recess 124 and the protrusion 136 (FIG. 4) of the spacer 130 are combined to make close contact between the end cap 120 and the spacer 130, the second circulation passage 104, which is an arc-shaped path, is formed. The second circulation passage outer peripheral wall 125 has a scooping beak 126 at its inward end (the end continuous with the load-carrying race 102), the beak protruding in a direction along the load-carrying race 102. The scooping beak 126 fits into the first raceway groove 12 (FIG. 1) of the rail 10. The scooping beak 126 causes the balls 200 to enter into the second circulation passage 104 from the load-carrying race 102. At an outward end of the second circulation passage outer peripheral wall 125, a first circulation passage outer peripheral wall end portion 127 is provided which continues to the second circulation passage outer peripheral wall 125 and constitutes a portion of the outer peripheral wall of the first circulation passage 103.

Figure 7:
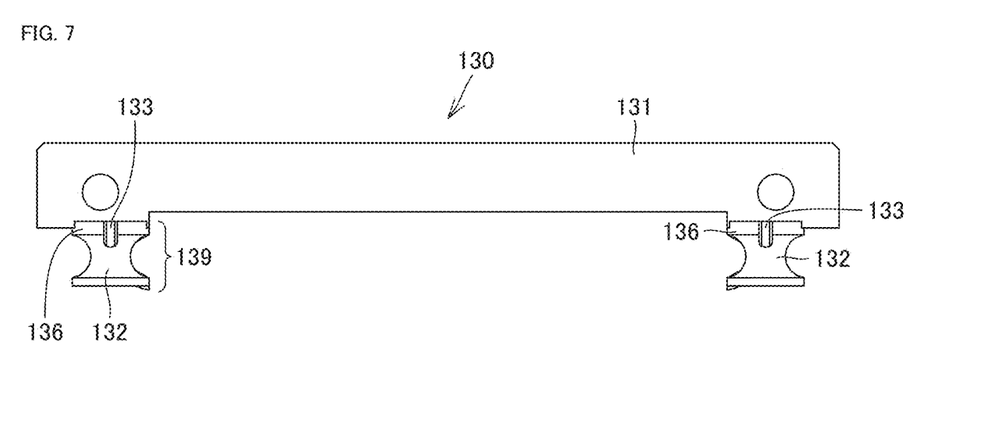
FIG. 7 is a front view showing the structure of a spacer in Embodiment 1.
Figure 8:
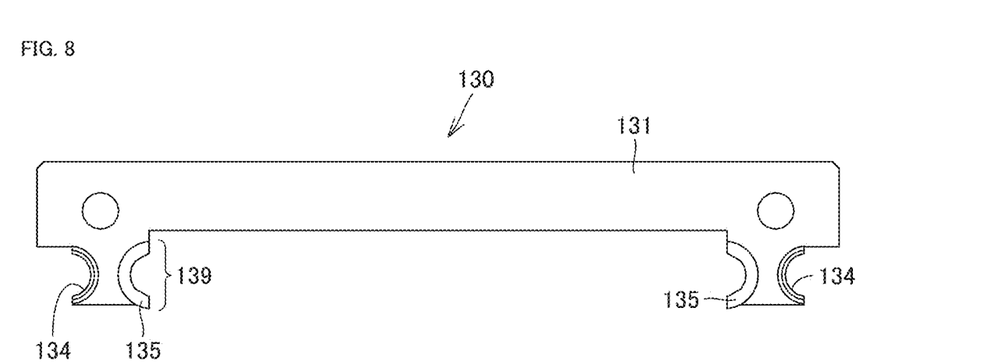
FIG. 8 is a rear view showing the structure of the spacer in Embodiment 1.
Figure 9:
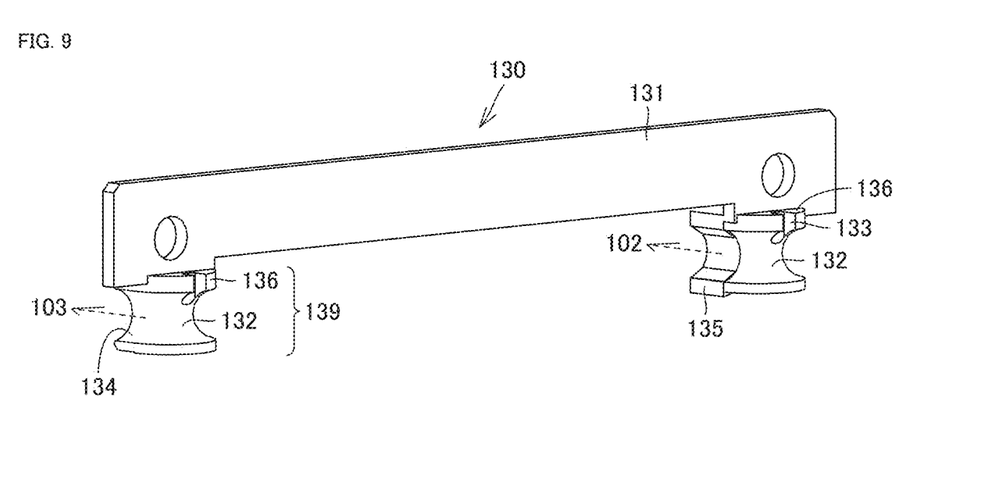
FIG. 9 is a perspective view showing the structure of the spacer in Embodiment 1.
Figure 10:
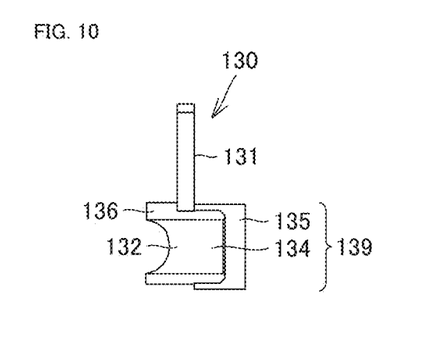
FIG. 10 is a side view showing the structure of the spacer in Embodiment 1.

FIG. 7 shows a front face of the spacer 130 (the face opposing the end cap 120). FIG. 8 shows a rear face of the spacer 130 (the face opposing the carriage 110). FIG. 9 is a perspective view of the spacer 130. FIG. 10 is a side view of the spacer 130. Referring to FIGS. 7, 9, and 10, on the front side of the spacer 130, the second circulation passage inner peripheral wall 132 and the protrusion 136 are provided in the leg portion 139 so as to protrude outwardly from the spacer plate 131. The protrusion 136 has an oil groove 133 provided at its center.

Figure 12:
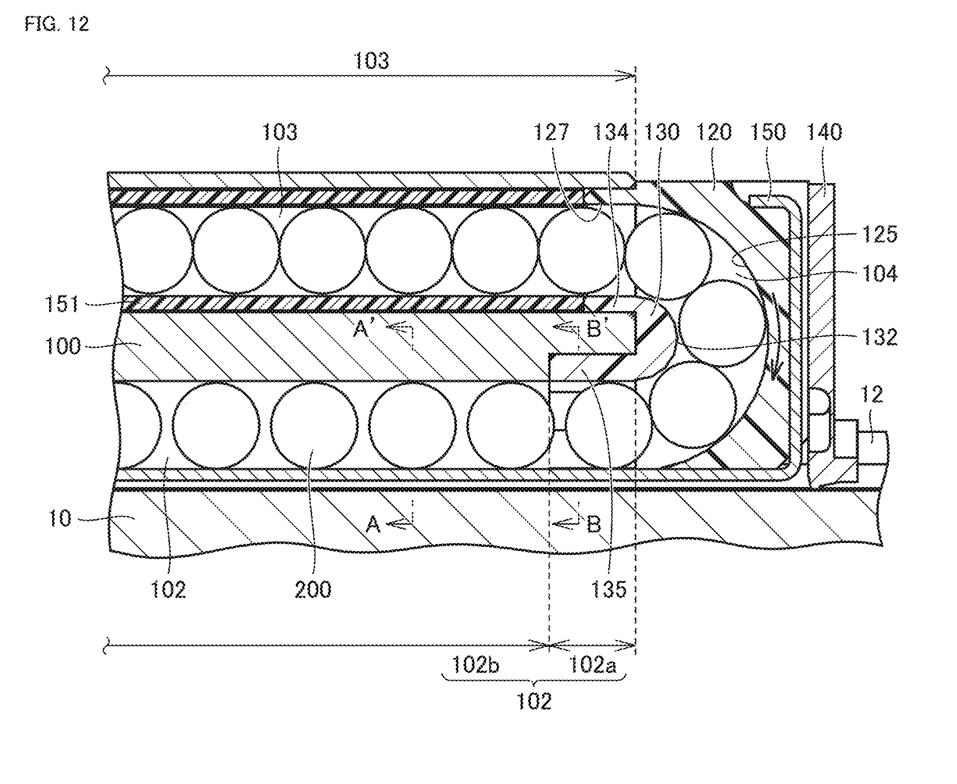
FIG. 12 is a schematic diagram showing, in an enlarged view, a partial cross section of the linear motion guide unit of Embodiment 1.

Referring to FIGS. 8 to 10, on the rear side of the spacer 130, the leg portion 139 is provided with the insertion member 135 constituting a portion of the inner peripheral wall of the load-carrying race 102, and a first circulation passage inner peripheral wall end portion 134 constituting a portion of the inner peripheral wall of the first circulation passage 103. On the rear side of the spacer 130, the insertion member 135 and the first circulation passage inner peripheral wall end portion 134 are provided to protrude outwardly from the spacer plate 131. The insertion member 135 opposes the first raceway groove 12 (FIG. 1) of the rail 10 to form the load-carrying race first portion 102a (FIG. 12). The first circulation passage inner peripheral wall end portion 134 is continuous with the second circulation passage inner peripheral wall 132. When the spacer 130 and the end cap 120 (FIG. 6) are combined, the first circulation passage inner peripheral wall end portion 134 opposes the first circulation passage outer peripheral wall end portion 127 (FIG. 6) of the end cap 120, to constitute an end portion of the first circulation passage 103.

Figure 11:
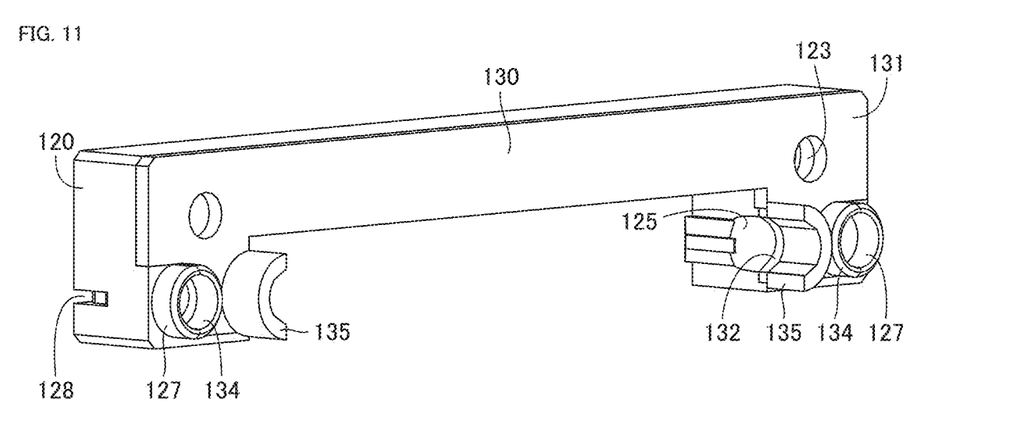
FIG. 11 is a perspective view showing the combined structure of the spacer and the end cap in Embodiment 1.

FIG. 11 shows the end cap 120 and the spacer 130 combined together. The first circulation passage inner peripheral wall end portion 134 of the spacer 130 and the first circulation passage outer peripheral wall end portion 127 of the end cap 120 oppose each other to form the end portion of the first circulation passage 103. The connection portion between the inner peripheral wall 132 of the second circulation passage 104 and the insertion member 135 constituting a portion of the inner peripheral wall of the load-carrying race 102 has a slight step because the inner peripheral wall 132 and the wall surface of the insertion member 135 differ in shape from each other.

FIG. 12 is an enlarged view of part of the cross-sectional view of the linear motion guide unit 1 shown in FIG. 2. Referring to FIG. 12, the rail 10 and the slider 100 are combined together. When the slider 100 is moved by an external force, the balls 200 contact the wall surface of the first raceway groove 12 and roll, thereby realizing relative sliding of the slider 100 with the rail 10.

In the slider 100, the main region of the first circulation passage 103 has its wall portion composed of a cylindrical member 151 extending in the longitudinal direction of the first circulation passage 103. At an end portion of the first circulation passage 103 (boundary portion between the first circulation passage 103 and the second circulation passage 104), the first circulation passage inner peripheral wall end portion 134 of the spacer 130 and the first circulation passage outer peripheral wall end portion 127 of the end cap 120 oppose each other. Further, the second circulation passage inner peripheral wall 132 and the second circulation passage outer peripheral wall 125 oppose each other to form the arc-shaped second circulation passage 104.

The load-carrying race 102 includes the load-carrying race first portion 102a formed with the first raceway groove 12 of the rail 10 and the insertion member 135 of the slider 100 opposing each other, and the load-carrying race second portion 102b formed with the first raceway groove 12 of the rail 10 and the second raceway groove 13 of the slider 100 opposing each other. The load-carrying race first portion 102a is at a boundary portion of the load-carrying race 102 with the second circulation passage 104.

Referring to FIG. 12, the first circulation passage 103 and the second circulation passage 104 are no-load areas, in which the balls 200 roll freely. The cylindrical member 151 of the first circulation passage 103 is a lubricated part, in which the balls 200 roll while being lubricated. On the other hand, the load-carrying race 102 is a load area, in which the balls 200 rotate on their own axes and orbit while abutting against the walls of the load-carrying race 102 (the surfaces of the first raceway groove 12 and the insertion member 135 in the load-carrying race first portion 102a, and the surfaces of the first raceway groove 12 and the second raceway groove 13 in the load-carrying race second portion 102b).

An operation of the linear motion guide unit 1 will now be described with reference to FIG. 12. In the linear motion guide unit 1, the rail 10 is fixed and the slider 100 moves on the rail 10 by an externally applied force. For example, when the slider 100 moves in a right direction (right direction in the paper plane of FIG. 12), the balls 200 orbit in a clockwise direction while rotating on their own axes. That is, the balls 200 advance from the first circulation passage 103 through the second circulation passage 104 to the load-carrying race 102. In the load-carrying race first portion 102a, which is the boundary portion between the second circulation passage 104 and the load-carrying race 102, the insertion member 135 is present. Therefore, a ball 200 entering the load-carrying race 102 from the second circulation passage 104 firstly passes through the insertion member 135 (the load-carrying race first portion 102a) in the load-carrying race 102, and then enters the load-carrying race second portion 102b formed with the first raceway groove 12 and the second raceway groove 13.

Figure 13:
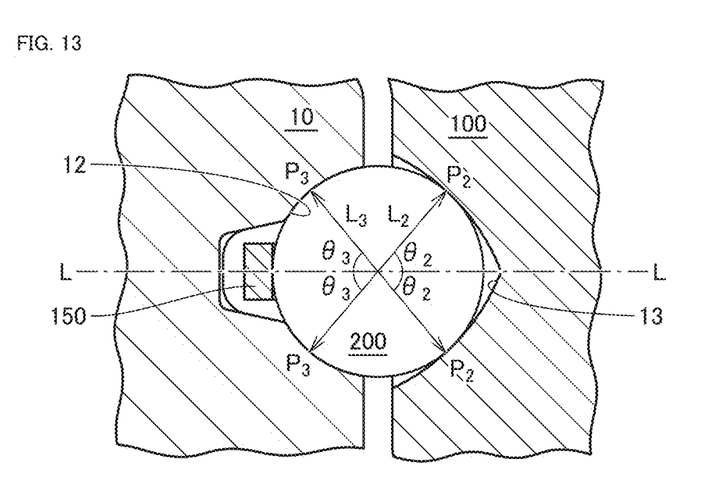
FIG. 13 is a schematic diagram showing the contact state of the wall surfaces and a rolling element in a load-carrying race second portion in Embodiment 1.

FIG. 13 shows an A-A' cross section in FIG. 12, which is a cross section in the load-carrying race second portion 102b. Referring to FIG. 13, a ball 200 is held between the rail 10 and the slider 100. The ball 200 and the rail 10 are in contact with each other at two contact points $p_3$ on the surface of the first raceway groove 12 of the rail 10, at a contact angle $\theta_3$ of 50°. The contact angle $\theta_3$ is an angle made by a line L extending horizontally through the center of the ball 200 and a line $L_3$ passing through the center of the ball 200 and the contact point $p_3$. The second raceway groove 13 in the slider 100 is a gothic arch groove, having a cross section of a gothic arch shape orthogonal to the longitudinal direction thereof. The ball 200 abuts on the second raceway groove 13 (second rolling surface) of the slider 100 at two contact points $p_2$, at a contact angle $\theta_2$ of 50°. The contact angle $\theta_2$ is an angle made by a line L extending horizontally through the center of the ball 200 and a line $L_2$ passing through the center of the ball 200 and the contact point $p_2$.

Figure 14:
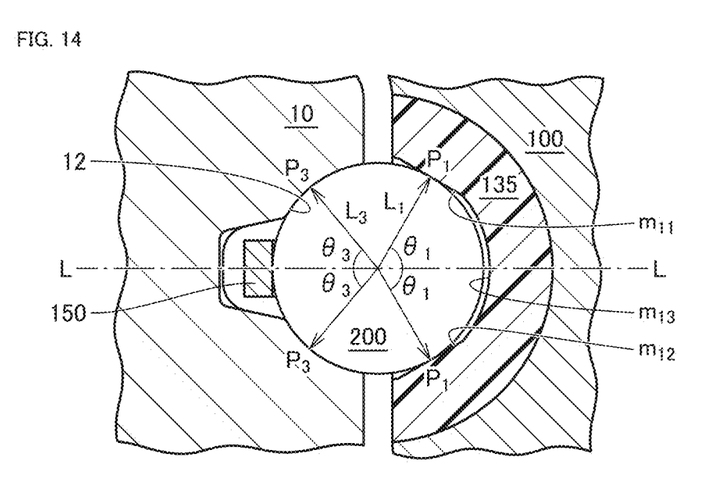
FIG. 14 is a schematic diagram showing the contact state of the wall surfaces and a rolling element in a load-carrying race first portion in Embodiment 1.

FIG. 14 shows a B-B' cross section in FIG. 12. A ball 200 is held between the rail 10 and the insertion member 135. The ball 200 and the rail 10 are in contact with each other at two contact points $p_3$ on the surface of the first raceway groove 12 of the rail 10, at a contact angle $\theta_3$ of 50°. The contact angle $\theta_3$ is an angle made by a line L extending horizontally through the center of the ball 200 and a line $L_3$ passing through the center of the ball 200 and the contact point $p_3$. The slider 100 is provided with the insertion member 135, and the ball 200 and the insertion member 135 are in contact with each other at two contact points $p_1$ on the surface (second rolling surface) of the insertion member 135. A contact angle $\theta_1$ between the ball 200 and the insertion member 135 is 60°. The contact angle $\theta_1$ is an angle made by a line L extending horizontally through the center of the ball 200 and a line $L_1$ passing through the center of the ball 200 and the contact point $p_1$. The contact angle $\theta_1$ remains unchanged over the longitudinal direction of the insertion member 135 (i.e., over the length direction of the load-carrying race first portion 102a). It should be noted that while the contact angle $\theta_1$ is constant over the length direction of the load-carrying race first portion 102a in Embodiment 1 as described above, the contact angle may be varied within the load-carrying race first portion.

In a cross section orthogonal to the longitudinal direction of the insertion member 135, the wall surfaces including the contact points $p_1$ are each flat. That is, in the load-carrying race first portion 102a, the inner wall surface of the insertion member 135 (the wall surface opposing the ball 200) includes two flat surfaces $m_{11}$ and $m_{12}$ that are contact surfaces at the respective contact points $p_1$ and extend in the longitudinal direction of the load-carrying race 102, and a curved surface $m_{13}$ that connects the two flat surfaces $m_{11}$ and $m_{12}$. In Embodiment 1, the curved surface $m_{13}$ is a curved surface having a constant curvature in its cross section, although it may be a single surface or a combination of a plurality of surfaces as long as it is a surface that connects the two flat surfaces $m_{11}$ and $m_{12}$.

Referring to FIGS. 13 and 14, the contact angle $\theta_1$ between the ball 200 and the load-carrying race wall surface in the portion (load-carrying race first portion 102a) of the load-carrying race 102 in which the insertion member 135 is disposed is greater than the contact angle $\theta_2$ between the ball 200 and the load-carrying race wall surface in the other portion (load-carrying race second portion 102b) of the load-carrying race 102. Here, there is a relationship that the greater the contact angle between the ball and the load-carrying race, the smaller the radius of rotation of the ball and the slower the orbital speed. From this, a ball 200 that enters the load-carrying race 102 from the second circulation passage 104 becomes slower in orbital speed in the load-carrying race first portion 102a than the ball that entered the load-carrying race 102 earlier (the preceding ball). As a result, a proper gap is created between the balls in the load-carrying race 102, and the occurrence of competition between the balls is suppressed.

While the contact angle $\theta_1$ is 10° greater than the contact angle $\theta_2$ in Embodiment 1, the difference in the contact angles is not limited thereto; it can be, for example, around 1° to 20°. The difference in the contact angles is more preferably 5° to 15°. Setting the difference in the contact angles to be around 1° to 20° makes it possible to adjust the rolling of the rolling elements to maintain the spacing between the rolling elements, without interfering with the rolling of the rolling elements.

Although the length of the insertion member 135 in the raceway direction (i.e., the length of the load-carrying race first portion 102a) is not particularly limited as long as the effect of the invention is obtained, it can be, for example, not less than 0.25 times and not more than 3 times the diameter of the rolling element 200. When the length of the load-carrying race first portion 102a is not less than 0.25 times the diameter of the rolling element, the effect of adjusting the traveling of the rolling elements and suppressing the occurrence of competition of the rolling elements can be obtained. Since the rolling elements located in the load-carrying race second portion 102b receive a load, it is preferable that the length of the load-carrying race second portion 102b is long (i.e., the length of the load-carrying race first portion 102a is short) so that the number of rolling elements located in the load-carrying race second portion 102b can be increased. For this reason, the length of the load-carrying race first portion 102a is preferably not more than 3 times the diameter of the rolling element. The specific length of the insertion member 135 in the raceway direction is selected according to the size of the entire linear motion guide unit 1 and the like, and is not particularly limited, although it can be, for example, 0.5 mm to 5 mm, and is more preferably 2 mm to 4 mm. The insertion member 135 can be formed of a resin, for example. Using a resin to form the insertion member 135 ensures a higher degree of freedom of the design than in the case of using a steel material. Further, integrating the insertion member with the spacer facilitates assembly, enabling the insertion member to be reliably disposed in the load-carrying race.

Example

A linear motion guide unit shown as Embodiment 1 was produced and operated in the sideways orientation. As a result of measurement of the orbital speeds of the rolling elements 200 in the load-carrying race first portion 102*a* and the load-carrying race second portion 102*b*, it was confirmed that the orbital speed was slower in the load-carrying race first portion 102*a* than in the load-carrying race second portion 102*b*, and that a gap was created between the rolling elements in the load-carrying race second portion 102*b*.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE NUMERALS

1: linear motion guide unit; 10: rail; 12: first raceway groove; 13: second raceway groove; 100: slider; 101: screw hole; 102: load-carrying race; 102*a*: load-carrying race first portion; 102*b*: load-carrying race second portion; 103: first circulation passage; 104: second circulation passage; 110: carriage; 120: end cap; 121: oil hole; 122: oil groove; 123: through hole; 124: recess; 125: second circulation passage outer peripheral wall; 126: scooping beak; 127: first circulation passage outer peripheral wall end portion; 128: retaining band groove; 130: spacer; 131: spacer plate; 132: second circulation passage inner peripheral wall; 133: oil groove; 134: first circulation passage inner peripheral wall end portion; 135: insertion member; 136: protrusion; 139: leg portion; 140: end seal; 150: retaining band; 151: cylindrical member; and 200: ball.

What is claimed is:

1. A linear motion guide unit comprising:
a rail having a pair of first rolling surfaces extending parallel to each other in a longitudinal direction;
a slider fitting over the rail in a relatively movable manner and having a pair of second rolling surfaces opposing the pair of first rolling surfaces, respectively; and
a plurality of spheres as rolling elements that roll while contacting the pair of first rolling surfaces and the pair of second rolling surfaces;
the linear motion guide unit having formed therein a loop path composed of
a load-carrying race formed with the pair of first rolling surfaces and the pair of second rolling surfaces,
a first circulation passage parallel to the load-carrying race and formed in the slider, and
two second circulation passages that are connecting portions between the load-carrying race and the first circulation passage,
the plurality of rolling elements circulating through the loop path, wherein
the load-carrying race has a load-carrying race first portion at a boundary with the second circulation passage, a contact angle $\theta_1$ of the plurality of rolling elements with the second rolling surface in the load-carrying race first portion being greater than a contact angle $\theta_2$ of the plurality of rolling elements with the second rolling surface in a portion of the load-carrying race other than the load-carrying race first portion,
the slider includes a carriage, a pair of end caps disposed to sandwich the carriage therebetween in the longitudinal direction of the rail, and a spacer disposed between at least one of the pair of end caps and the carriage, and
the spacer has the second rolling surface constituting the load-carrying race first portion.

2. The linear motion guide unit according to claim 1, wherein the spacer is a resin molded member.

3. The linear motion guide unit according to claim 1, wherein the load-carrying race first portion has a length in the longitudinal direction of the rail of not less than 0.25 times and not more than 3 times a diameter of the rolling element.

4. The linear motion guide unit according to claim 3, wherein in the load-carrying race first portion, the plurality of rolling elements contact the pair of second rolling surface at two points, and each of the pair of second rolling surfaces containing the respective contact points is a flat surface extending in the longitudinal direction of the rail.

5. The linear motion guide unit according to claim 4, wherein the contact angle $\theta_1$ is 1° to 20° greater than the contact angle $\theta_2$.

6. The linear motion guide unit according to claim 3, wherein the contact angle $\theta_1$ is 1° to 20° greater than the contact angle $\theta_2$.

7. The linear motion guide unit according to claim 1, wherein in the load-carrying race first portion, the plurality of rolling elements contact the pair of second rolling surface at two points, and each of the pair of second surfaces containing the respective contact points is a flat surface extending in the longitudinal direction of the rail.

8. The linear motion guide unit according to claim 1, wherein the contact angle $\theta_1$ is 1° to 20° greater than the contact angle $\theta_2$.

* * * * *